No. 895,332. PATENTED AUG. 4, 1908.
J. VON BERTOUCH.
MACHINE FOR CLEARING LAND, ROADS, AND STREETS.
APPLICATION FILED JULY 11, 1907.
2 SHEETS—SHEET 1.
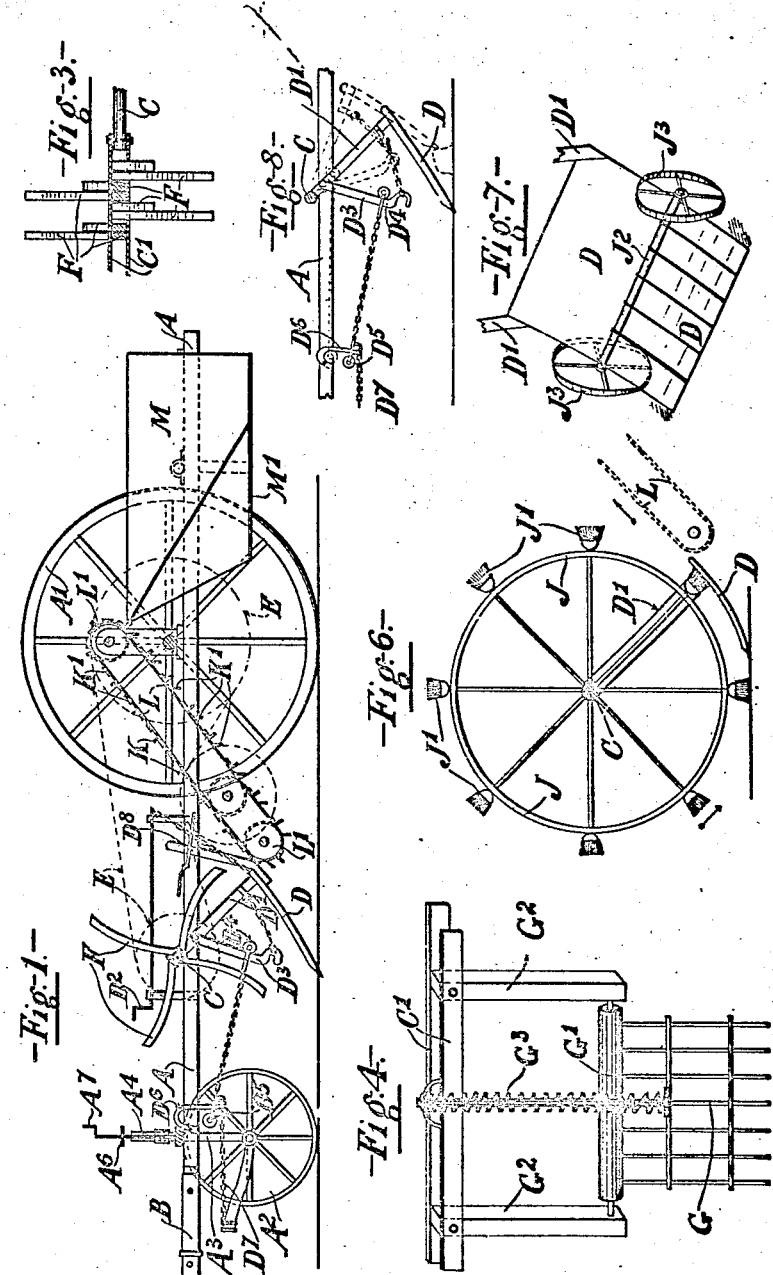

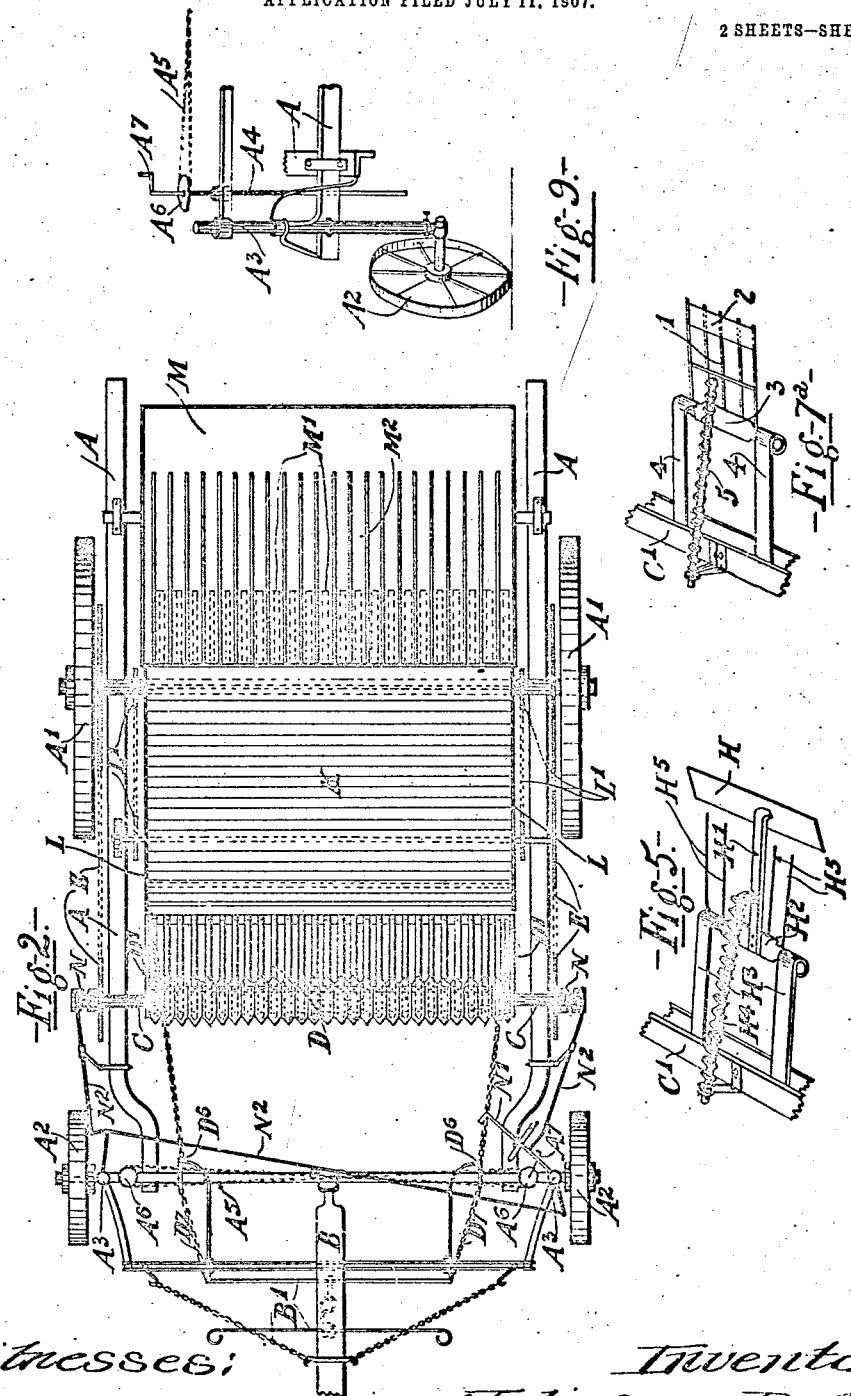

UNITED STATES PATENT OFFICE.

JULIUS VON BERTOUCH, OF KAPUNDA, SOUTH AUSTRALIA, AUSTRALIA.

MACHINE FOR CLEARING LAND, ROADS, AND STREETS.

No. 895,332.  Specification of Letters Patent.  Patented Aug. 4, 1908.

Application filed July 11, 1907. Serial No. 383,229.

*To all whom it may concern:*

Be it known that I, JULIUS VON BERTOUCH, a subject of the King of Great Britain, residing at Kapunda, in the State of South Australia, in the Commonwealth of Australia, licensed surveyor, have invented a certain new and useful Improved Machine for Clearing Land, Roads, and Streets, of which the following is a specification.

My invention relates to an improved machine for clearing land, roads, or streets, and refers more particularly to that class of machines in which the material to be cleared is gathered and conveyed up an endless elevator to a collecting receptacle.

The object of my invention is to provide an effective machine capable of being easily interchangeable for gathering loose stones or stumps, onions, potatoes, earth, and the like, cutting and collecting weeds, and sweeping roads or streets. I accomplish this by providing a machine having a gathering device consisting of an adjustable stump-jumping rake or scoop of special construction adapted to engage obstacles at or near the surface of the ground, and a rotating double spindle having interchangeable gatherers, beaters, or brushes which carry or convey the material over the rake or scoop to an endless elevator of special construction which conveys the material to a tip receptacle connected to the frame-work at the rear of the machine.

In order that my invention may be the better understood, I will now proceed to describe the same with reference to the accompanying drawings in which:—

Figure 1 is a side elevation showing the general arrangement of my machine as used for gathering stones and the like. Fig. 2 is a plan of the same with the gatherers or beaters removed. Fig. 3 is a detail front view of portion of the gatherers. Fig. 4 is a detail view of one of the gatherers for onions, potatoes, and the like. Fig. 5 is a detail perspective view of one of the cutters with whips employed for weed clearing. Figs. 6 and 7 are detail views of one form of brushes and scoop for street sweeping. Fig. 7ª is a detail view of a device for gathering such as snow, ice, or earth. Fig. 8 is a detail view showing the jumping action of the rake or scoop. Fig. 9 is a perspective view showing the means for raising and lowering the ends of the framework.

In the drawings A is the main frame-work of the machine suitably mounted in wheels $A^1$ and $A^2$, the front wheels $A^2$ being supported by standards $A^3$, upon which the front end of the frame-work A is adapted to slide vertically. It is capable of being raised and lowered by means of screw rods $A^4$ at either side, connected by an endless chain $A^5$, working on sprocket wheels $A^6$, one of the screw rods $A^4$, having an operating handle $A^7$. The front of the frame-work A is provided with a pole B and swingle connections $B^1$ for the attachment of horses.

Within the frame-work A is mounted a spindle C to which is hinged an interchangeable rake or scoop D by means of arms $D^1$. The rake or scoop D is arranged to collect obstacles or material at or near the surface of the ground. The rake or scoop D may be provided with interchangeable teeth or shovels which are preferably adjustable and reversible as shown in Fig. 2 adapted for gathering stones, stumps, onions, potatoes, weeds, earth, and the like. The rake or scoop D may be adjusted in relation to the ground and to rotating gatherers, beaters, cutters, or brushes arranged above it as hereinafter described by means of a lever $D^2$, and may be lifted clear of the ground when not in use, such as for transport. The rake or scoop D is capable of a jumping action so as to pass over fixed stumps and the like. In order to compensate this action and to maintain the rake or scoop D in position, suitable springs, weights, or draft power may be provided. In Fig. 8 one form of draft power is shown. The arms $D^1$ are each provided with a draft arm $D^3$ working in a pulley or roller $D^4$ linked to another pulley or roller $D^5$ working on a guide $D^6$ hinged to the frame-work A and connecting with the front portion of the frame-work by a draft chain $D^7$. This draft power may be disconnected from the rake or scoop D to afford a draft direct on the frame-work A.

An adjustable stay or stop arm $D^8$ connecting with the framework A is provided for preventing the rake from being drawn forward beyond its adjusted position.

The portion of the spindle C which extends across the fore part of the machine between the arms $D^1$ of the rake or scoop D is comprised of two parallel bars between which the arms of the gatherers, beaters, cutters, or brushes may be adjustably mounted as desired, and are thereby capable of being arranged in adjustable sections along the double bar portion $C^1$ and of being extended out wards in varying directions from it. The double bar portion C¹ may be interchangeable as a whole according to the various purposes for which the machine is employed. The spindle C is driven from the wheels A¹ by chains and sprockets E, whereby a rotating movement is imparted to the gatherers, beaters, cutters, or brushes.

For gathering loose stones, stumps, or the like the gatherers or beaters are constructed in the form of arms F, and bolted between the double bars C¹, as shown in Figs. 1 and 3. The arms F may be arranged to extend outwards in various positions by bending some of them at the point where they join the double bars C¹. When gathering certain classes of stones or stumps these gatherers or beaters F may be dispensed with.

When used for onion, potato, and the like gathering I preferably employ gatherers, as shown in Fig. 4. Each consists of a rake device G, preferably of spring steel, attached to a plate or crossbar G¹ hinged between two arms G², adjustably bolted to the double bars C¹, and having a compressible spring G³ connecting the rake device G and the double bars C¹, whereby the rake device G is capable of a jumping action to pass over fixed stumps, and of gathering and delivering the onions, potatoes, and the like to the rear as hereinafter described. A series of these gatherers are applied to the double bars C¹.

For cutting noxious weeds I employ a series of devices like the one shown in Fig. 5, consisting of a cutting blade H adjustably mounted upon an arm H¹ preferably of spring steel, extending from a plate or crossbar H² hinged between arms H³, adjustably mounted between the double bars C¹, and having a compressible spring H⁴ arranged between the rear portion of the arm H¹ and the double bars C¹ whereby a stump-jumping action is provided. Whips or rods H⁵, preferably of spring steel, are provided on the plate or crossbar H² to catch the cut weeds and throw them to the rear. The cutting blade H is capable of adjustment to any desired angle, and may be reversed when one edge is worn. The weeds may be collected in a supplementary receptacle suspended to the frame-work A behind the cutting blades H instead of employing an endless elevator as hereinafter described, but if it is only desired to cut the weeds and not gather them, the receptacle may be dispensed with.

My machine may be adapted for cleaning or sweeping roads, streets, or the like by providing the rotating spindle C with a cylindrical framing J having a series of brushes or brooms J¹ around its circumference which sweep the material to the scoop D, and from thence to an endless elevator. If desired, the cylindrical framing J may be supported by arms adjustably mounted between the double bars C¹. The lower portion of the scoop D is preferably constructed in hinged sections as shown in Fig. 7 so that each section rises and falls with the variations in the surface to be cleared. The sections are hinged to an axle J² supported on wheels J³, which regulate the position of the scoop D, and the arms D¹ supporting the scoop are connected with the spindle C upon which the brushes J¹ rotate.

My machine may also be adapted for gathering snow, ice, and earth. For this purpose I employ a series of devices as shown in Fig. 7ª. Each consists of a rake device 1 having a plate 2 for engaging the material, the said rake device 1 being attached to a plate or crossbar 3 hinged between two arms 4 adjustably bolted to the double bars C¹ and having a compressible spring 5 connecting the rake device 1 and the double bars C¹ whereby the rake device 1 is capable of a jumping action and of gathering and delivering the snow, ice, or earth to the rear. The rake or scoop D is formed of bars fitting more closely together than those shown in Fig. 2 for gathering such as stones and stumps.

The endless elevator receives the material from the rake or scoop D, or from the gatherers and cutting devices hereinbefore described. The elevator consists of a series of projecting metal bars or ribs K, extending partly across the machine and attached at suitable intervals to endless chains L revolving on sprocket wheels L¹ driven from the wheels A¹ of the machine by means of the sprocket wheels and chains E, which may be arranged in any desired position to suit the convenience of the machine, and to secure the best possible driving power. For example, instead of placing the intermediate spindle with sprocket wheel under the main driving chain as shown in Fig. 1 it may be situated above the main driving chain and the elevator driving chain be connected with the lower spindle of the elevator. The bars or ribs K serve to catch or grip the material and effectually convey it to the collecting receptacle M. The spaces between the bars or ribs K may be wholly or partly filled by flat pieces of metal K¹ connected with the endless chains L. These flat pieces of metal K¹ are hinged at their ends so that they tilt when passing around the upper curve of the elevator, and hang in a vertical position as shown in Fig. 1 when passing on the underneath side of the elevator so as to allow loose earth or the like to fall through with facility. When gathering stones or stumps, onions, potatoes and the like, openings are preferably left to allow loose earth and the like to fall to the ground. The elevator may be provided with suitable guards on either side whereby the material is prevented from falling over. Adjusting screws are also provided whereby the lower end of the elevator may be raised or lowered when required. Suitable clutch gearing N is also provided for throwing the working parts of the machine out of operation. This may be operated from a handle N¹ through connecting rods N². The gearing of the machine may be so arranged that variable speeds may be imparted to both the spindle C and the elevator, an increased speed being required for such as cutting weeds, and a reduced speed for such as gathering onions and potatoes. For this purpose interchangeable sprocket or cog wheels and chains may be employed or the elevator may be driven by means of cog and pinion wheels adjustable in relation to the driving wheels A¹ of the machine. The collecting receptacle M is preferably arranged at the rear of the machine, partly underneath the elevator, and is capable of a tilting action. When used for gathering stones, stumps, onions, potatoes, or the like, a grating or opening M¹ is provided at the bottom, whereby loose earth and the like may fall back to the ground, and the size of the material collected be regulated. In conjunction with the grating or openings M¹ an opening or partly opening and closing false bottom adjusted by means of slides may be provided. When gathering earth or cleaning roads it is necessary that the bottom of the receptacle M should be closed. A slide or grader M² may be hung from the upper fore part of the receptacle M so as to incline to or towards the bottom and rear of the receptacle M, whereby the materials may be distributed in the receptacle according to their respective sizes.

If desired a suitable cover may be provided over a part or the whole of the machine. The adjustable parts of my invention are so arranged that the machine may be readily changed from a stone, stump, earth, snow, ice, onion, or potato and the like gatherer, to a weed cutter and or gatherer, to a clod breaker or road cleaner, or vice versa, as desired.

Having thus described my invention, what I claim as new, and desire to secure by Letters Patent of the United States is:—

1. A machine of the class described comprising a supporting frame, a scoop carried thereon, a rotary spindle journaled on the frame having means for operating it, and means for interchangeably supporting gatherers on said spindle in coöperative relation with said scoop and serving to convey the material over the scoop.

2. A machine of the class described comprising a supporting frame, a scoop carried thereon and arranged in proximity to the ground, a pair of axially alined spindles journaled on the frame, means for revolving the respective spindles, and means for interchangeably supporting gatherers on said spindles and in coöperative relation with the scoop for conveying the material over the scoop.

3. A machine for clearing land, roads, and streets, comprising the combination of a collecting device consisting of a stump-jumping rake or scoop adapted to collect obstacles at or near the surface of the ground, and an interchangeable rotatable device having gatherers, beaters, cutters, or brushes which convey the material over the rake or scoop to an endless elevator from which it is conveyed to a collecting receptacle substantially as described and for the purposes indicated.

4. In a machine for clearing land, roads, and streets, the combination with a stump-jumping rake or scoop for gathering loose obstacles (such as stones, stumps, onions, potatoes, and the like) at or near the surface of the ground; of a rotating spindle arranged above the said rake or scoop, comprising two parallel bars, between which are adjustably mounted a series of outwardly extending gatherers or beaters capable of automatically conveying such obstacles rearwards substantially as described and for the purposes indicated.

5. In a machine for clearing land a rotatable spindle extending across the fore part of the machine, and having a series of outwardly extending gatherers for such as onions and potatoes, each consisting of a rake device attached to a plate or crossbar hinged between two arms adjustably secured to the said spindle, the said rake device having a jumping action against the tension of a spiral spring arranged above it, and the rotatable spindle whereby the materials are gathered and conveyed to the rear substantially as described.

6. In a machine for clearing land, roads, and streets, the combination with a rotatable cylindrical frame-work carrying brushes or brooms; of a collecting scoop whose lower portion is constructed in sections hinged to an axle supported on wheels, whereby each section rises and falls with the variations in the surface of the ground substantially as described.

7. In a machine for clearing land, roads, and streets, the combination with a stump-jumping rake or scoop and rotating means for throwing up or conveying the material rearwards; of an endless elevator discharging into a collecting receptacle consisting of a series of projecting metal bars or ribs arranged transversely and attached at suitable intervals to an endless chain revolving on sprocket or cog wheels driven from a wheel of the machine, the said elevator having adjusting set screws or the like for altering its incline substantially as described and for the purposes indicated.

8. In a machine for clearing land the combination with a stump-jumping rake or scoop and rotatable means for throwing up or conveying the material rearwards; of an endless elevator, discharging into a collecting receptacle, and consisting of a series of projecting metal bars or ribs arranged transversely and attached at suitable intervals to an endless chain, to which are also connected flat pieces of metal arranged to wholly or partly fill the spaces between the bars or ribs, which flat pieces are hinged so as to tilt to a vertical position when they pass around the upper curve and along the underneath side of the elevator, which is driven from a wheel of the machine, and has set screws or the like for altering its incline substantially as described and for the purposes indicated.

9. In a machine for clearing land, roads, and streets, the combination with a stump-jumping rake or scoop and rotatable means for throwing up or conveying the material rearwards over the said rake or scoop and to an endless elevator; of a collecting receptacle capable of a tilting action and having a grating or adjustable openings at the bottom, and a slide or grader extending from its upper fore part to or towards the bottom at an incline whereby the materials falling into the receptacle may be distributed according to their respective sizes substantially as described and for the purposes indicated.

10. In a machine for clearing land, roads, and streets, a rake or scoop hinged to a spindle mounted in the frame work and having a draft arm working in a pulley or roller linked to another pulley or roller working on a guide hinged to the frame-work and connecting with the front portion of the frame-work by a draft chain, the said rake or scoop being held in position by a stay or stop arm connecting with the frame-work and having a lever and connections for raising and holding it out of operation substantially as described and for the purposes indicated.

11. In a machine for clearing land, roads, and streets, the combination with a frame-work in which is mounted a collecting rake or scoop, and a rotatable device for conveying or throwing the material rearwards; of means for raising and lowering the fore part of the said frame-work consisting in loosely mounting its ends on the front wheel standards and providing screw rods at either side connected by an endless chain working on sprocket wheels, one of the screw rods having an operating handle substantially as described.

12. In a machine for clearing land, roads, and streets, the combination with a gathering rake or scoop and a rotatable device for throwing up or conveying the material rearwards and an endless elevator both driven from the wheel of the machine; of clutch gearing for throwing the working parts out of operation.

13. A machine of the class described comprising a supporting frame, a scoop mounted thereon and arranged in proximity to the ground, a spindle journaled in said frame means for revolving the spindle, and a gatherer mounted on said spindle comprising a set of radial arms, devices hinged on the ends of said arms on axes parallel to the spindle and arranged to coöperate with the material for conveying the latter over said scoop, and means for yieldingly retaining said hinged devices in operative position relatively to said supporting arms.

In testimony whereof I affix my signature in presence of two witnesses.

JULIUS VON BERTOUCH.

Witnesses:
CHARLES STANLEY BURGESS,
ARTHUR WHITRIDGE BOWEN.